United States Patent
Satish

(10) Patent No.: US 12,229,343 B2
(45) Date of Patent: Feb. 18, 2025

(54) SYSTEM, DEVICE AND METHOD FOR REAL TIME GESTURE PREDICTION

(71) Applicant: ARACIV TECHNOLOGIES PRIVATE LIMITED, Chennai (IN)

(72) Inventor: Abhishek Satish, Chennai (IN)

(73) Assignee: ARACIV TECHNOLOGIES PRIVATE LIMITED, Chennai (IN)

( * ) Notice: Subject to any disclaimer, the term of this patent is extended or adjusted under 35 U.S.C. 154(b) by 0 days.

(21) Appl. No.: 18/033,532

(22) PCT Filed: Sep. 20, 2021

(86) PCT No.: PCT/IB2021/058538
§ 371 (c)(1),
(2) Date: Apr. 24, 2023

(87) PCT Pub. No.: WO2022/084766
PCT Pub. Date: Apr. 28, 2022

(65) Prior Publication Data
US 2024/0019937 A1     Jan. 18, 2024

(30) Foreign Application Priority Data
Oct. 24, 2020   (IN) .............................. 202041046479

(51) Int. Cl.
*G06F 3/01*     (2006.01)
(52) U.S. Cl.
CPC .................................... *G06F 3/017* (2013.01)
(58) Field of Classification Search
CPC .......... G06F 3/017; G06F 18/24; G06F 18/28; G06N 20/00
See application file for complete search history.

(56) References Cited

U.S. PATENT DOCUMENTS

| 2014/0240103 A1* | 8/2014 | Lake | G06F 1/163 340/12.5 |
| 2015/0301606 A1* | 10/2015 | Andrei | G06F 1/163 345/156 |
| 2016/0334880 A1* | 11/2016 | Favre | G06V 40/20 |

(Continued)

OTHER PUBLICATIONS

Search Report for International Patent Application PCT/IB2021/058538, mailed on Dec. 29, 2021, 6 pages.

*Primary Examiner* — Hong Zhou
(74) *Attorney, Agent, or Firm* — Fresh IP PLC; Emily Do; Aubrey Y. Chen

(57) ABSTRACT

The present disclosure describes a gesture prediction system which includes a non-transitory storage device coupled to one or more processors (202) having embodied therein one or more routines. The one or more routines are operable to store and update gestures; capture and record gestures (e.g., via a plurality of sensors); retrieve data corresponding to the gestures, and extract features to generate Look-Up-Tables. The processors are thereby configured to execute and update a first set of features and thus predict the performance of a gesture. Such prediction may be based on a machine learning and artificial intelligence model and by comparing and updating the features. Additionally, new gestures can be trained without requiring a massive dataset of gesture performances as required by most existing machine-learning and/or artificial-intelligence based solutions.

10 Claims, 12 Drawing Sheets

(56) References Cited

U.S. PATENT DOCUMENTS

2020/0289055 A1     9/2020   Vleugels
2023/0280835 A1*    9/2023   McDaniel .............. G06F 3/016
                                                         345/156

* cited by examiner

SYSTEM, DEVICE AND METHOD FOR REAL TIME GESTURE PREDICTION

TECHNICAL FIELD

The present disclosure relates to the field of gesture recognition. More particularly, the present disclosure relates to an approach for faster and more efficient gesture prediction.

BACKGROUND

The background information presented herein is solely for the purpose of providing better understanding to the technical field(s) relating to the present disclosure.

Contemporary gesture recognition relies on power-hungry methods which necessitate large memory sizes, powerful processors and high-speed interfaces like USB 3.0, which add to complexity and weight of the systems. Some examples of such power-hungry approaches include machine learning methods such as deep learning, neural network, and convolutional neural network-based predictions performed on data from imaging devices like RGB cameras. Such systems are becoming increasingly challenging to realize in terms of thermal design limitations, cost as well as battery life, especially as the world moves to more mobile and portable devices such as Augmented-Reality headsets that require more intuitive and immersive interaction mediums.

Most conventional methods either have low-accuracy or high computing power requirements for gesture recognition. For example, Deep Learning, Support Vector Machines, Convolutional Neural Networks, Neural Networks are complex machine learning algorithms. On a platform with low computing power, training and updating the model to include new gestures is possible only at the cost of a significantly long processing time. Therefore, all low-power systems currently require sending data to a higher power system to generate an updated model, but this leads to a high degree of latency. This is because most conventional approaches to machine learning and artificial intelligence based gesture recognition require a large amount of gesture performance data for accuracy, and the latency arises from the requirement of transferring raw data to an alternate compute platform, executing the prediction on that platform and sending the data back. Even on high-power compute platforms there is typically a high amount of latency that is compensated with high throughput/latency hiding. In the event that the data throughput is low, the latency is high enough to be observable.

There is therefore a need in the art to develop an approach for a more efficient gesture recognition process that would allow for a much better interface without the caveats of high computational requirements.

SUMMARY

A general object of the present disclosure is to provide an approach for efficient and fast gesture prediction.

Another object of the present disclosure is to provide a computationally efficient approach that can be run on using reduced computing resource with minimum latency and high accuracy.

Another object of the present disclosure is to provide a means for on-device training for gesture prediction.

Another object of the present disclosure is to provide an approach to add gestures without the target device being tethered to a high-power compute platform.

The present disclosure relates to the field of gesture recognition. More particularly, the present disclosure relates to an approach for faster and more efficient gesture prediction.

According to an aspect of the present disclosure, a gesture prediction system is provided which may include a non-transitory storage device having embodied therein one or more routines operable that may store and update gestures; and one or more processors coupled to the non-transitory storage device that may be operable to execute the one or more routines to: extract, by a plurality of sensors coupled to the one or more processors, at least a first set of gestures; isolate, by the one or more processors, the first set of gestures based on a first set of motion threshold values and a first set of preset configuration parameters to determine a second set of gestures, wherein a window size of a particular length stores the second set of gestures; extract, by the one or more processors, a first set of features, based on the window size and a second set of preset configuration parameters, the one or more features being used to generate one or more Look-Up-Tables; maintain, by the one or more processors, the Look-Up-Table at the non-volatile storage device; generate, by the one or more processors, a buffer window based on a third set of preset configuration parameters and the Look-Up-Table; compare, by the one or more processors, the first set features with the contents of the Look-Up-Table and a predetermined set of features to determine a second set of features; predict, by the one or more processors, performance of a gesture based on the Look-Up-Table and the second set of features; train, by the one or more processors, the performance of a gesture to be generated on receipt of a third set of gestures from the plurality of sensors; and update, by the one or more processors, the second set of features into the Look-Up-Table.

According to an embodiment, the plurality of sensors may extract and process data in real time. In yet another embodiment, the plurality of sensors may transfer data with a fixed frequency to perform gesture processing.

According to an exemplary embodiment, the plurality of sensors may include accelerometer, gyroscope, magnetometer, temperature, humidity sensors and the like.

According to an embodiment, the number of features may be based on any or a combination of operating parameters such as available power, similarity and number of gestures.

According to an aspect of the present disclosure, a gesture prediction device may be provided which may include a non-transitory storage device having embodied therein one or more routines operable that may store and update gestures; and one or more processors coupled to the non-transitory storage device that may be operable to execute the one or more routines to: extract, by a plurality of sensors coupled to the one or more processors, at least a first set of gestures; isolate, by the one or more processors, the first set of gestures based on a first set of motion threshold values and a first set of preset configuration parameters to determine a second set of gestures, wherein a window size of a particular length stores the second set of gestures; extract, by the one or more processors, a first set of features, based on the window size and a second set of preset configuration parameters, the one or more features being used to generate one or more Look-Up-Tables; maintain, by the one or more processors, the Look-Up-Table at the non-volatile storage device; generate, by the one or more processors, a buffer window based on a third set of preset configuration parameters and the Look-Up-Table; compare, by the one or more processors, the first set features with the contents of the Look-Up-Table and a predetermined set of features to determine a second set of features; predict, by the one or more processors, performance of a gesture based on the Look-Up-Table and the second set of features; train, by the one or more processors, the performance of a gesture to be generated on receipt of a third set of gestures from the plurality of sensors; and update, by the one or more processors, the second set of features into the Look-Up-Table.

According to an embodiment, isolation of gestures may be performed for a particular time period indicating the start and stop of an individual gesture recording, the time period may be ascertained by non-limiting factors such as pressing of a button, blinking of a LED, and vibration of the device.

According to an exemplary embodiment, the device may include any or a combination of handheld, mounted and wearable devices.

According to an aspect, a method for providing gesture prediction that may include the steps of: extracting, by a plurality of sensors coupled to the one or more processors, at least a first set of gestures; isolating, by the one or more processors, the first set of gestures based on a first set of motion threshold values and a first set of preset configuration parameters to determine a second set of gestures, wherein a window size of a particular length stores the second set of gestures; extracting, by the one or more processors, a first set of features, based on the window size and a second set of preset configuration parameters, the one or more features being used to generate one or more Look-Up-Tables; maintaining, by the one or more processors, the Look-Up-Table at the non-volatile storage device; generate, by the one or more processors, a buffer window based on a third set of preset configuration parameters and the Look-Up-Table; comparing, by the one or more processors, the first set features with the contents of the Look-Up-Table and a predetermined set of features to determine a second set of features; predicting, by the one or more processors, performance of a gesture based on the Look-Up-Table and the second set of features; training, by the one or more processors, the performance of a gesture to be generated on receipt of a third set of gestures from the plurality of sensors; and updating, by the one or more processors, the second set of features into the Look-Up-Table.

According to an embodiment, the method may provide for the set of features to be extracted based on frequency defined in the first set of preset configuration rules.

According to an embodiment, the method may provide for the set of features to be extracted based on a fixed buffer window size defined in the first set of preset configuration rules.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

DETAILED DESCRIPTION

Figure 1:
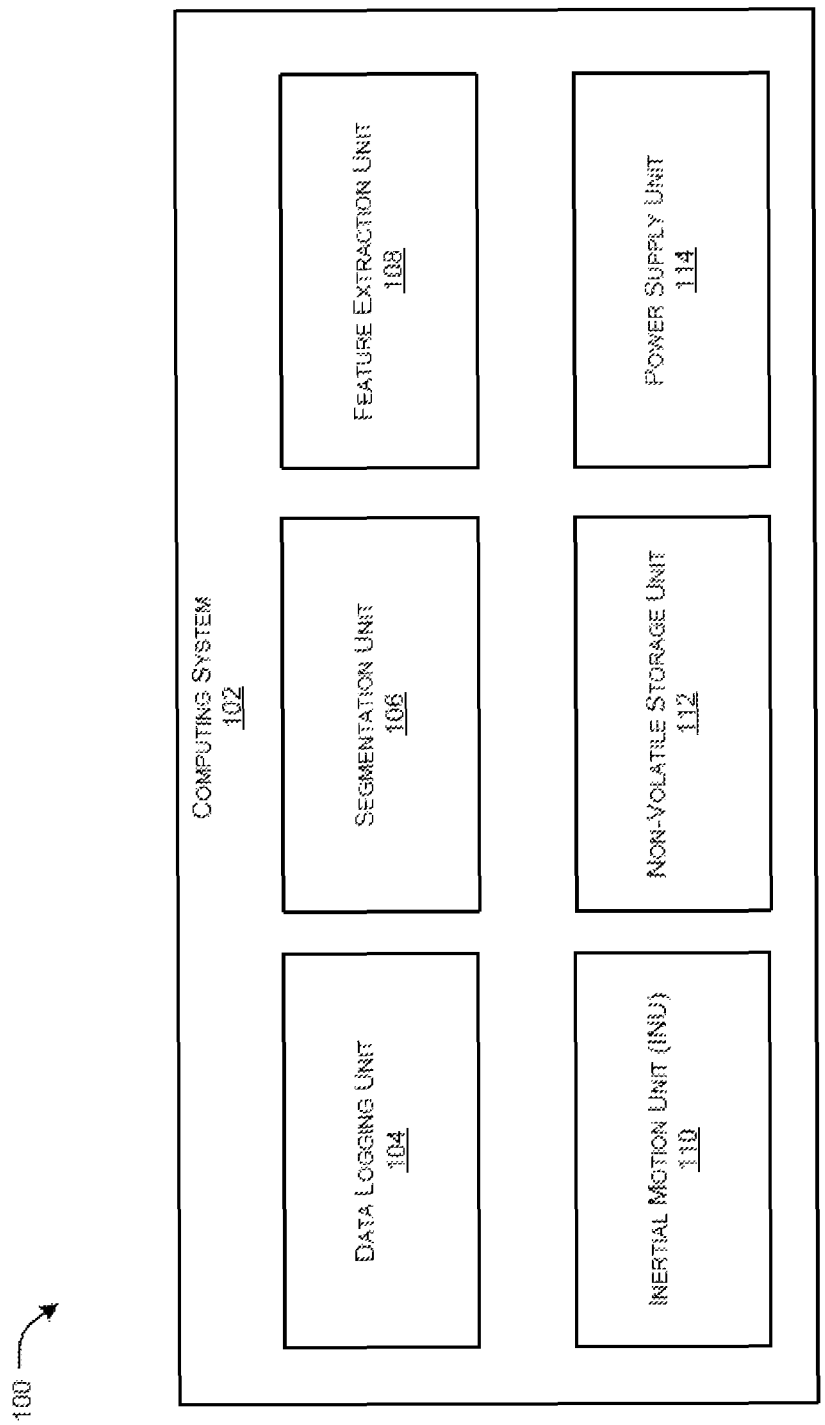
FIG. 1 illustrates exemplary architecture in which or with which proposed system may be implemented, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Embodiments of the present disclosure may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a unit, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

The term "features" as is used herein, generally refers to a set of specific variables that are used as input to a method. Features can be selections of raw values from input data, or can be values derived from that data. More specifically, features can refer to general neighborhood operation (feature classifiers or feature detectors) applied on input signals from any or a combination of accelerometer, vibration, sound, image, electrical signals and the like to deliver precise prediction with lowest computational overhead.

The present disclosure relates to the field of gesture recognition. More particularly, the present disclosure relates to an approach for faster and more efficient gesture prediction.

FIG. 1 illustrates an exemplary architecture 100 in which or with which proposed system can be implemented in accordance with an embodiment of the present disclosure. As illustrated in FIG. 1, a computing system 102 (interchangeably referred to as system 102, hereinafter) coupled to a non-volatile storage unit 112. The computing system 102 may include a data logging unit 104, a segmentation unit 106, a feature extraction unit 108, a plurality of motion sensors 110 (interchangeably referred to as Inertial Motion Unit or IMU, hereinafter), non-volatile storage unit 112, and a power supply unit 114. The computing system 102 can generate executable set of instructions to perform motion data extraction and may process data to determine gestures which will finally lead to gesture prediction. In an exemplary embodiment, the computing system 102 can be a smart phone, a personal computer, a single board computer, an embedded system and the likes.

In an embodiment, the computing system 102 can generate an executable set of instructions to activate the data logging unit 104 to extract gesture related data from the environment. The data logging unit generates a set of executable instructions to configure the IMU 110 which can track and capture gesture based information in 3 or 6 degrees of freedom. In an exemplary embodiment, the IMU 110 can include accelerometer, gyroscope, magnetometer, temperature, humidity sensors and the likes. The computing system 102 can be coupled to IMU 110 to process the transfer of data from IMU 110 to the data logging unit 104.

In an embodiment, upon receiving data by the data logging unit 102, an executable set of instructions can be sent to the segmentation unit 106 by the computing system 102. The segmentation unit 106 can perform a series of data processing operations which can lead to the isolation of data in any of the available degrees of freedom and can provide the first step towards the generation of synthetic data for training and evaluation.

In another embodiment, the feature extraction unit 108 can be activated by a set of executable instructions by the computing system 102, once isolation is performed by the segmentation unit 106. In an example, the features can characterize any or a combination of mean, median, minimum, correlation, dynamic warping, etc. In an exemplary embodiment, the number of features can be selected on the basis of various operating parameters not limited to available compute power on the target compute device, similarity of the gestures performed, number of gestures etc.

In an embodiment, the feature extraction unit 108, can generate the features and can update the features in the form of a Look-Up-Table 340. On the execution of a set of instructions, the computing system 102 can command the feature extraction unit 108 to store the Look-Up-Table 340 in the non-volatile storage unit 112, the non-volatile storage unit 112 can be coupled to the computing system 102. The non-volatile storage unit can include any non-transitory storage device for example, volatile memory such as RAM, or non-volatile memory such as EPROM, flash memory, and the like.

In an embodiment, the system 100 can include one or more power supply units 114 that can be, but not limited to electrical power supply, one or more batteries, and any other power source.

Figure 2:
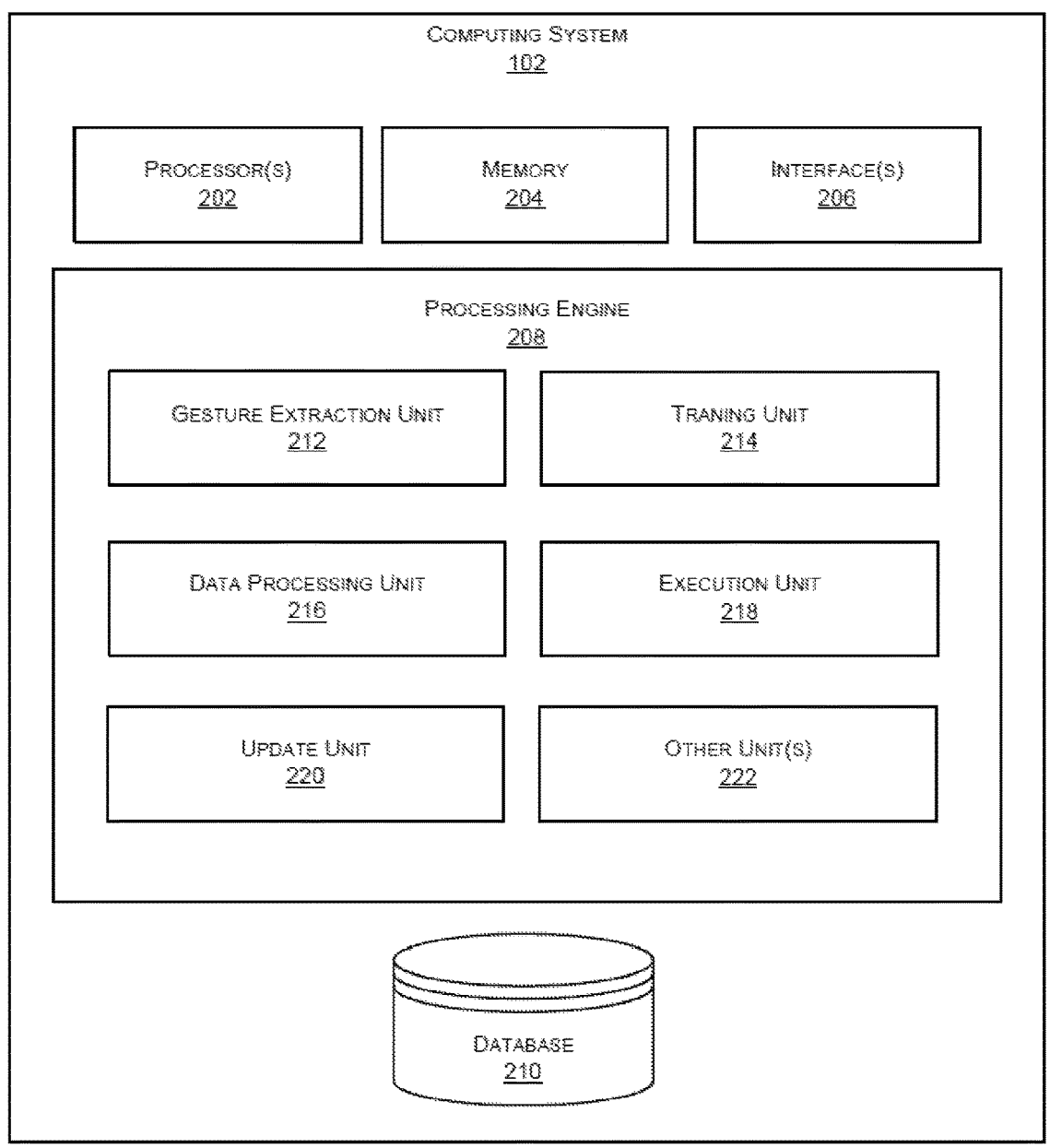
FIG. 2 illustrates an exemplary representation of the computing system for processing gesture data, in accordance with an embodiment of the present disclosure.

FIG. 2 illustrates an exemplary representation of the computing system 102 for processing gesture data, in accordance with an embodiment of the present disclosure.

As illustrated, the computing system 102 can include one or more processor(s) 202. The one or more processor(s) 202 can be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 204 of the computing system 102. The memory 204 can store one or more computer-readable instructions or routines, which may be fetched and executed to create or share the data units over a network service. The memory 204 can include any non-transitory storage device including, for example, volatile memory such as RAM, or non-volatile memory such as EPROM, flash memory, and the like.

The computing system 102 can also include an interface(s) 206. The interface(s) 206 may include a variety of interfaces, for example, interfaces for data input and output devices, referred to as I/O devices, storage devices, and the like. The interface(s) 206 may facilitate communication of the computing system 102 with various devices coupled to the computing system 102. The interface(s) 206 may also provide a communication pathway for one or more components of the computing system 102. Examples of such components include, but are not limited to, processing engine(s) 208 and database 210.

The processing engine(s) 208 can be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may include a processing resource (for example, one or more processors), to execute such instructions. In the present examples, the machine-readable storage medium may store instructions that, when executed by the processing resource, implement the processing engine(s) 208. In such examples, the computing system 102 can include the machine-readable storage medium storing the instructions and the processing resource to execute the instructions, or the machine-readable storage medium may be separate but accessible to be control unit 102 and the processing resource. In other examples, the processing engine(s) 208 may be implemented by electronic circuitry. The database 210 can include data that is either stored or generated as a result of functionalities implemented by any of the components of the processing engine(s) 208.

In an example, the processing engine(s) 208 can include a gesture extraction unit 212, a training unit 214, a data processing unit 216, an execution unit 218, an update unit 220, and other unit(s) 222. The other unit(s) 220 can implement functionalities that supplement applications or functions performed by the computing system 102 or the processing engine(s) 208.

In embodiment, the gesture extraction unit 212 of the proposed computing system 102 can acquire gesture parameters from IMU 110. Examples of gesture parameters can be any or a combination of orientation and motion either in 3D or 2D space. In an example, a sensor-based motion system can capture 3D hand and finger motions. The gesture extraction unit 212 sends the recorded gestures to the training unit 214 for further processing. The system 100 can perform the gesture prediction operable through one or more important units, not limiting to the training unit 214, a data processing unit 216, an execution unit 218, and update unit 220.

Training Unit

In an embodiment, the training unit 214 can be operatively coupled with the data logging unit 104, segmentation unit 106, feature extraction unit 108, IMU 110 and the non-volatile storage unit 112. An executable set of instructions can be provided that can configure the IMU 110 to record gesture based data. In an exemplary embodiment, gesture based data from the IMU 110 can be sent to the one or processors 202 at a fixed frequency F.

In an embodiment, the data logging unit 104 can perform processing on several recorded gestures obtained from IMU 110. In an exemplary embodiment, the data logging unit can perform operations on at least N number of gestures for at least M number of times, and herein M>=3.

In an embodiment, the training unit 214 can include the segmentation unit 106 that can perform isolation of each individual recorded gesture. In an exemplary embodiment, isolation can be done via motion threshold in any of the available degrees of freedom, herein the motion threshold being any or a combination of, but not limited to, motion recorded by the accelerometer, and motion recorded by the gyroscope. In another exemplary embodiment, isolation can be done via a condition indicating the duration of the gesture, the condition being any or a combination of, but not limited to, a button press during the performance of the gesture, a LED indicating the start and stop of an individual gesture recording, a vibration indicating the start and stop of an individual gesture recording. Herein, the maximum duration of an individual gesture can be determined by examining the individual gesture performance.

In an embodiment, the training unit 214 can provide for an executable set of instructions through one or more processors 202 to configure a buffer window that can enable examination of the data recorded from the IMU 110 for obtaining a true gesture information from a plethora of unrelated data. The size of the window can indicate the number of samples required in the recorded data from IMU 110 to obtain an actual gesture. In an exemplary embodiment, a window of W size is set to a time duration of T (in seconds) and frequency of F (in Hz).

In an embodiment, the training unit 214 can provide a set of executable instructions to configure the feature extraction unit 108 to collect the gesture data from the segmentation unit 106 and herein based on the individual gesture performances one or more number of features can be selected. Each acquired feature can be determined by performing any or a combination of statistical and mathematical operations on the window size 320 samples recorded from the IMU 110. In an exemplary embodiment, the feature characteristics can include any or a combination of mean, median, maximum, minimum, correlation, dynamic time warping, and the likes. For example, the feature number can be F. In yet, another embodiment, the number of features F can be selected on the basis of various operating parameters, the operating parameters can be any or a combination of, but not limited to, available compute power on the computing system 102, similarity of the number of gestures performed, and the number of gestures.

Data Processing Unit

In an embodiment, a set of executable instructions can be generated by one or more processors 202 to configure the data processing unit 216, herein data from the feature extraction unit 108 can be processed. The data processing unit 216, can generate a Look-Up-Table 340 to store the features for each of the performances of the gestures created. In an exemplary embodiment, F number of features with M number of performances for N number of gestures can lead to a total of F*N*M number of features in the Look-Up-Table 340. The Look-Up-Table 340 can be stored in the non-volatile storage unit 112 operative coupled to the computing system 102 and the processors 208, herein the Look-Up-Table 340 can be used for, but not limited to, direct comparison of computed features for gesture prediction, and training any or a combination of machine learning, and artificial intelligence algorithms. For example, the machine learning and artificial intelligence can include, but not limited to, a Naive-Bayes classifier, an SVM classifier and, an artificial neural network.

Execution Unit

In an embodiment, once the Look-Up-Table 340 is generated in the data processing unit 216, an executable set of instructions can be called to configure the execution unit 218, the execution unit can be operatively coupled to the processors 202, memory 204, non-volatile storage unit 112 and, the IMU 110. A buffer window size 320 can be maintained at the memory 204, the width of the buffer window being the number of gestures being sampled. A first set of instructions can be generated by the execution unit 218 depending on pre-defined initial conditions, the initial conditions can include, but not limited to, button press, specific orientation and, GPIO event.

For example, in an exemplary embodiment, every 1/F seconds if a desired initial condition is met, a data frame from the IMU can be pushed into the buffer window of size W. The length of the buffer window can be maintained at L and incremented on each push.

In an exemplary embodiment, upon meeting any of the conditions of desired size characteristics of the buffer window, and a desired final condition, the processors 202 can provide for an executable set of instructions to the execution unit 218, the execution unit 218 herein, the buffer can extract the features determined in the training unit 214. For example, the desired final condition can include any or a combination of button release, specific orientation, specific buffer size, GPIO event, etc.

In yet another embodiment, the extracted features can be used to perform any or a combination of comparing with the contents of the Look-Up-Table 340, and passing as inputs to a model that was generated using the Look-Up-Table 340. In an exemplary embodiment, any or the combination of the model, and the comparison can provide prediction of gesture performed based on the features.

Update Unit

In an embodiment, once the Look-Up-Table 340 is generated in the data processing unit 216, an executable set of instructions can be called to configure the update unit 220, the update unit can be operatively coupled to the processors 202, memory 204, non-volatile storage unit 112 and, the IMU 110. The Look-Up-Table 340 can be stored in the non-volatile unit 112. A buffer window size 320 can be maintained at the memory 204, the width of the buffer window being the number of gestures being sampled. A first set of instructions can be generated by the update unit 220 depending on pre-defined initial conditions, the initial conditions can include, but not limited to, button press, specific orientation and, GPIO event.

For example, in an exemplary embodiment, every 1/F seconds if a desired initial condition is met, a data frame from the IMU can be pushed into the buffer window of size W. The length of the buffer window can be maintained at L and incremented on each push.

In an exemplary embodiment, upon meeting any of the conditions of desired size characteristics of the buffer window, and a desired final condition, the processors 202 can provide for an executable set of instructions to the update unit 220, the update unit 220 herein, the buffer can extract the features determined in the training unit 214. For example, the desired final condition can include any or a combination of button release, specific orientation, specific buffer size, GPIO event, etc.

In yet another embodiment, the extracted features can be to update the contents of the Look-Up-Table 340 and stored herein in non-volatile storage unit 112.

In yet another embodiment, the functional models described herein can be assembled to provide for a target computing device 304 (interchangeably referred to as device 304 hereinafter), wherein the device 304 can be wearable and compactable without dependence on a higher computing device 304.

Figure 3A:
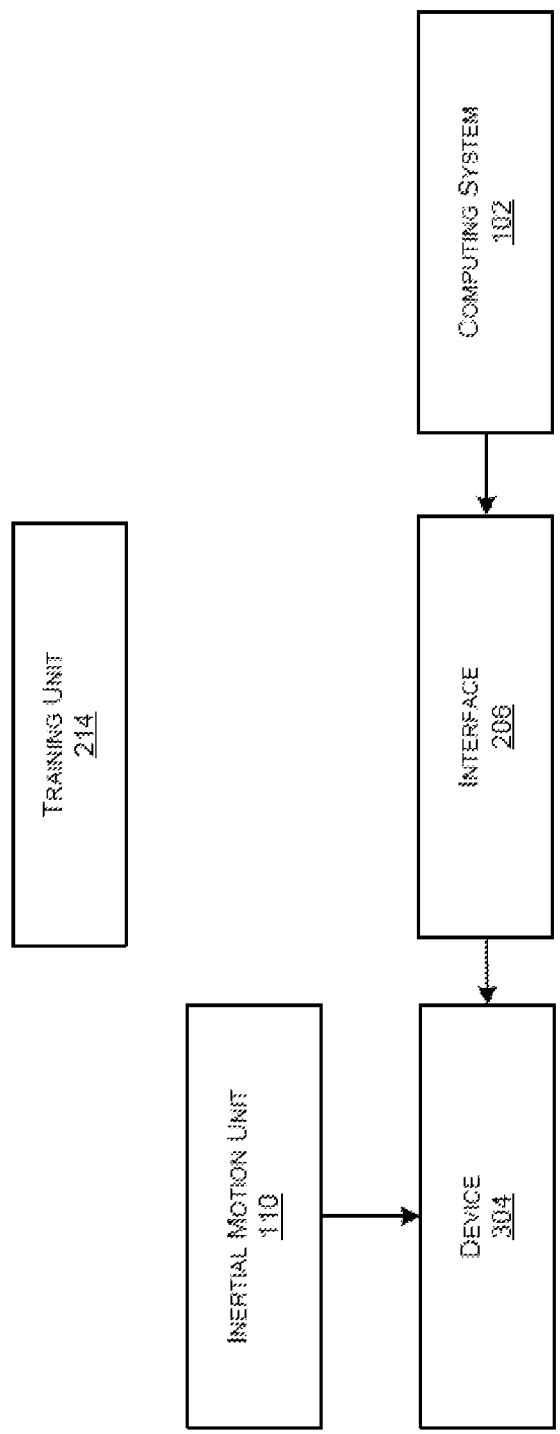
FIGS. 3A-C illustrate exemplary implementations of the gesture processing system in accordance with an embodiment of the present disclosure.
Figure 3B:
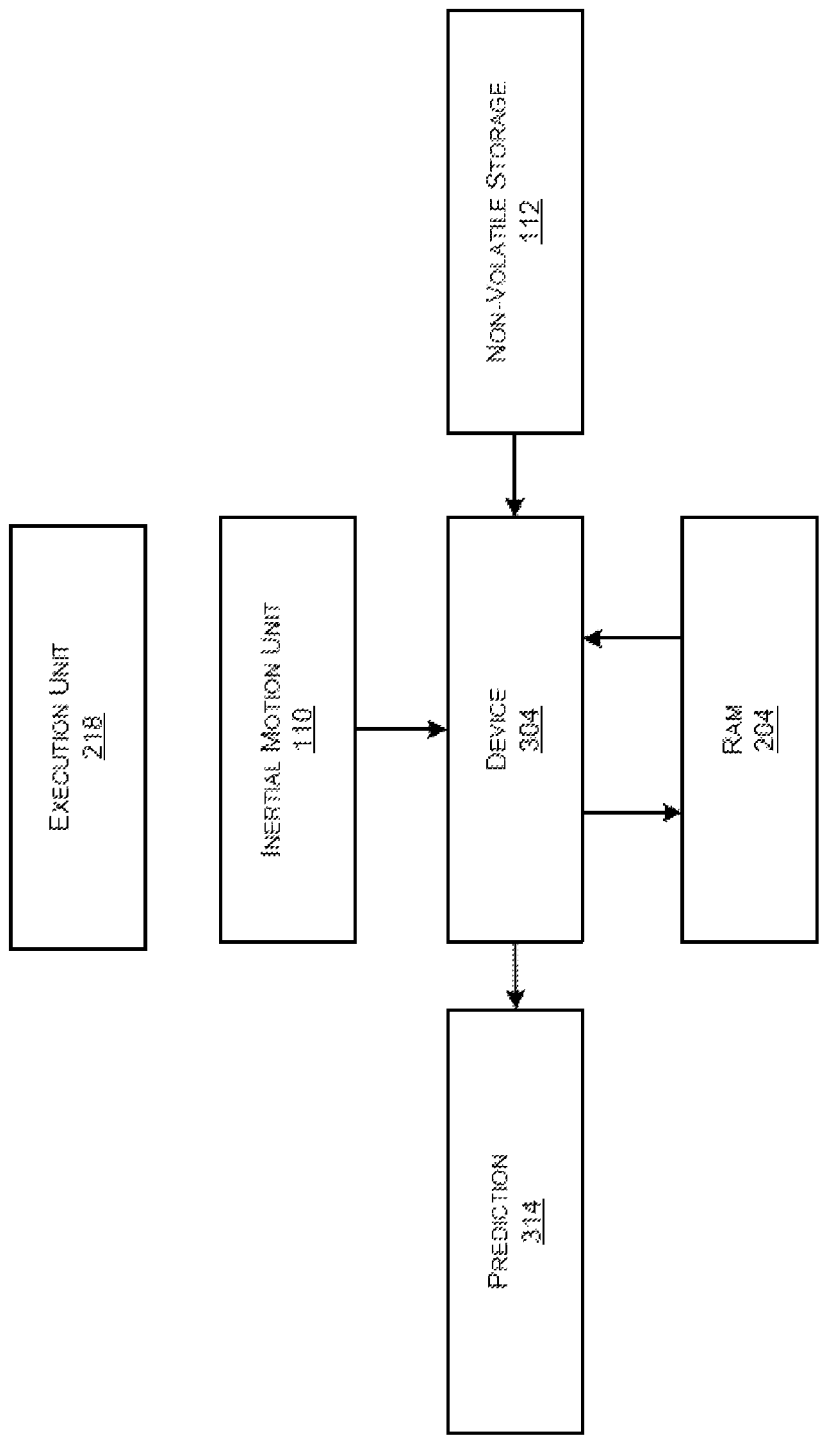
Figure 3C:
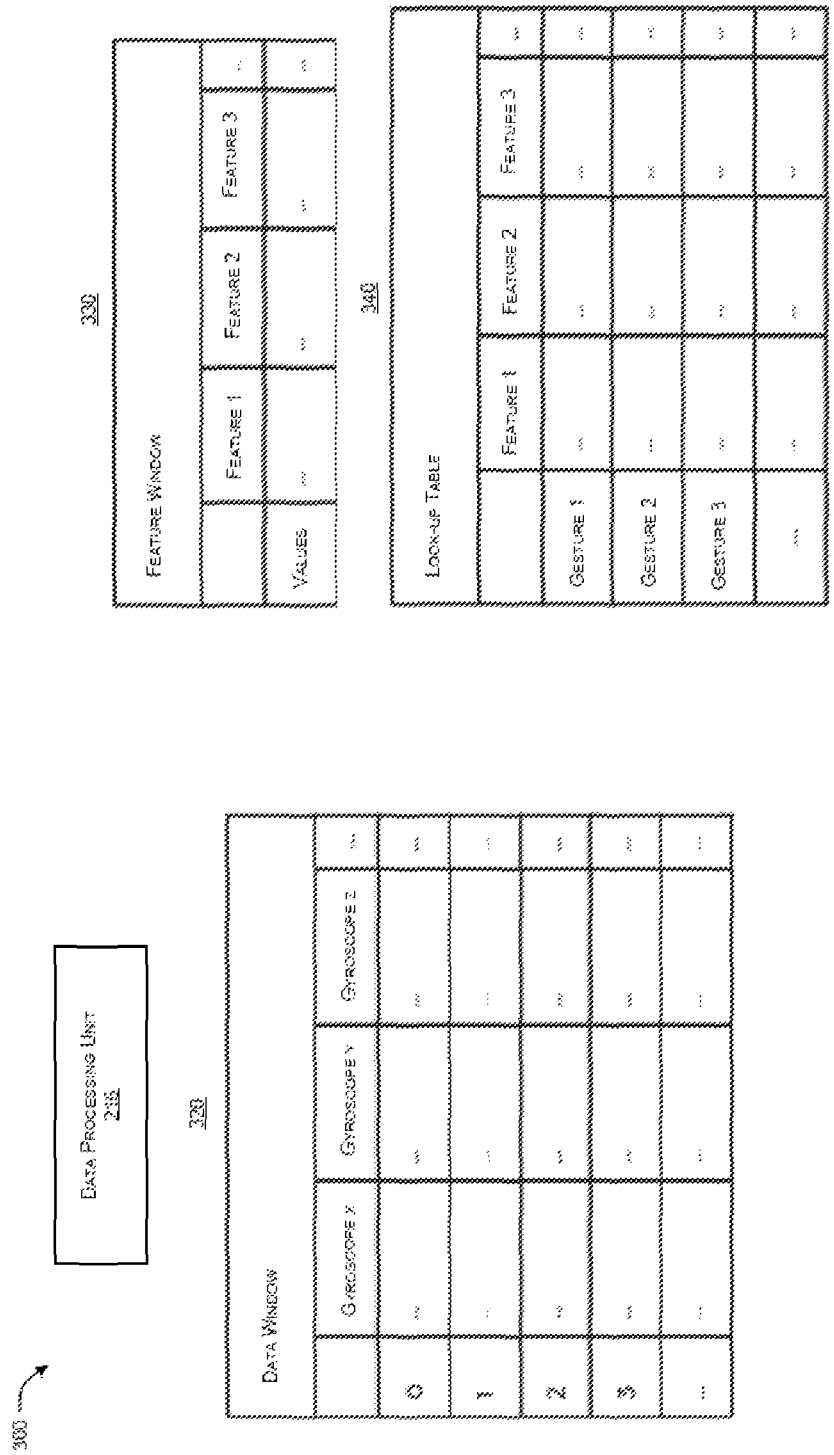

FIGS. 3A-C illustrate exemplary implementations of the gesture processing system in accordance with an embodiment of the present disclosure.

In an example, as illustrated in FIG. 3A, the training unit 214 can include the IMU 110, coupled to the device 304, that can include an interface 206 and a computing system 102.

In another example, the execution unit 218 is illustrated in FIG. 3B in accordance with an embodiment of the present disclosure. Herein, the device 304, can be operatively coupled to a memory RAM 204, the IMU 110, a non-volatile storage device 112 and a prediction unit 314.

In yet another example, in FIG. 3C, different units that can include a gesture window 320, a feature window 330 and a Look-Up-Table 340 can provide for the data processing unit 218. The units in the data processing unit 218, on execution of a set of instructions, can perform machine learning and artificial intelligence algorithms to maintain, process and generate gestures. The gesture window 320 can provide 3D data obtained from a gyroscope, accelerometer and the likes. The feature window 330 can include one or more feature values and the Look-Up-Table 340 can include a mathematical combination of both gesture and feature values.

For example, the device 304 can be designed for any or a combination of a module to be put in helmets for the detection of a falling gesture, a remote controller that can use gestures to navigate through various menus on a smart television, a presenter that uses gestures to navigate between various media that can include presentations and videos, a ring that can use gestures to control various actions on a smartphone or a next generation AR/VR headset and the like.

Figure 4:
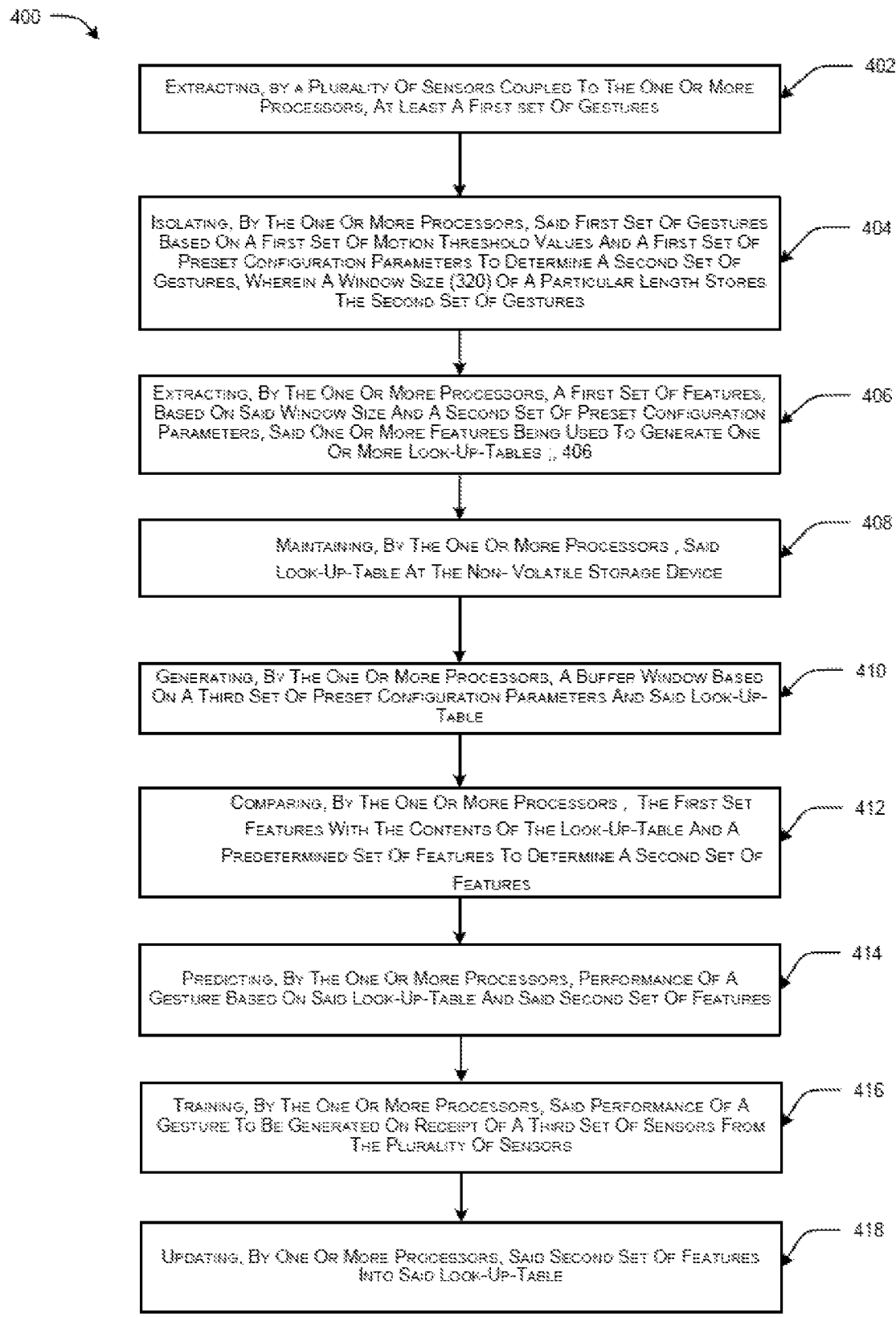
FIG. 4 illustrates a method of working of proposed system in accordance with an exemplary embodiment of the present disclosure.
Figure 5A:
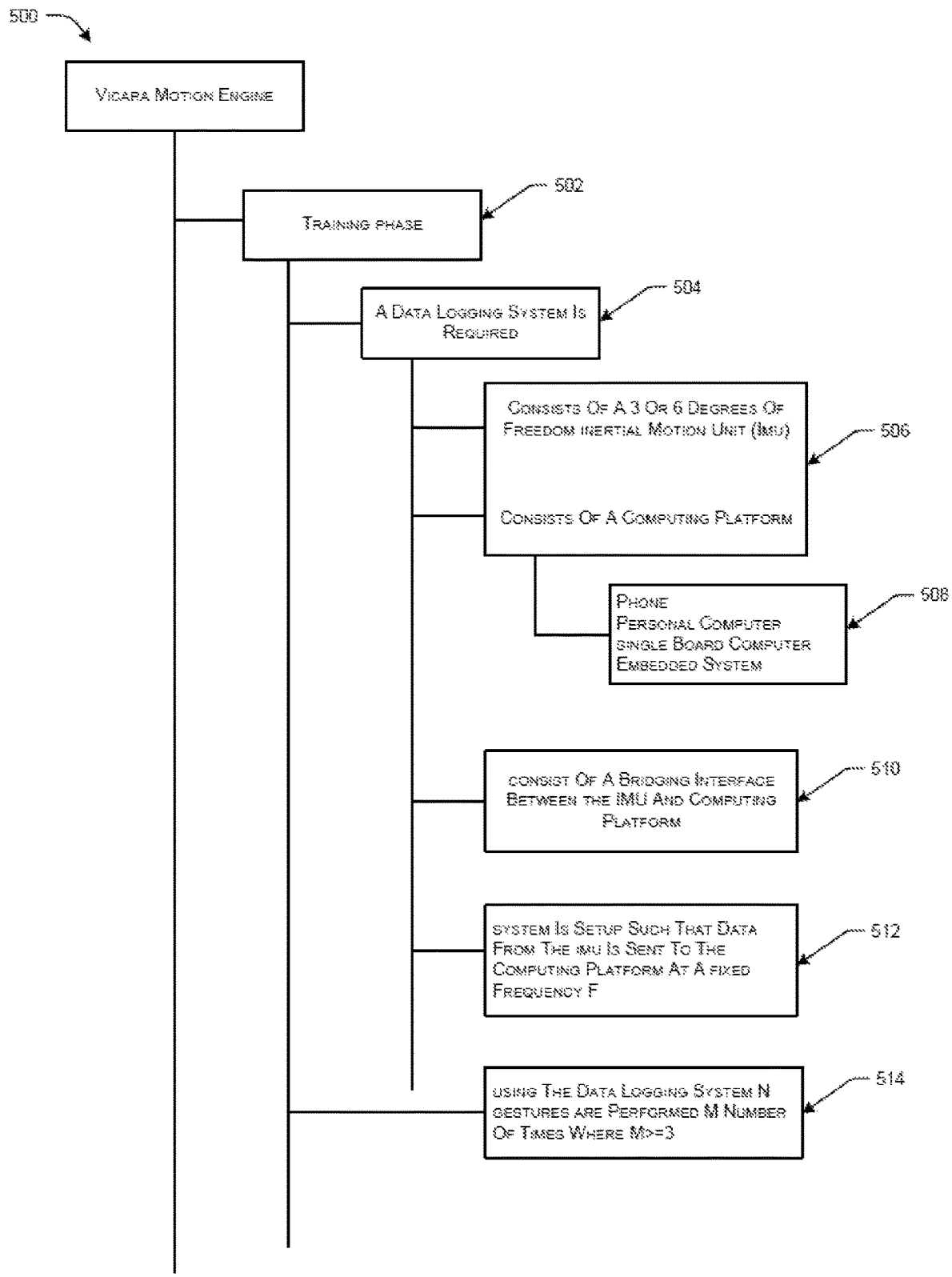
FIG. 5A-5F illustrates a high-level flow diagram representing exemplary working of the proposed system in accordance with an embodiment of the present disclosure.
Figure 5B:
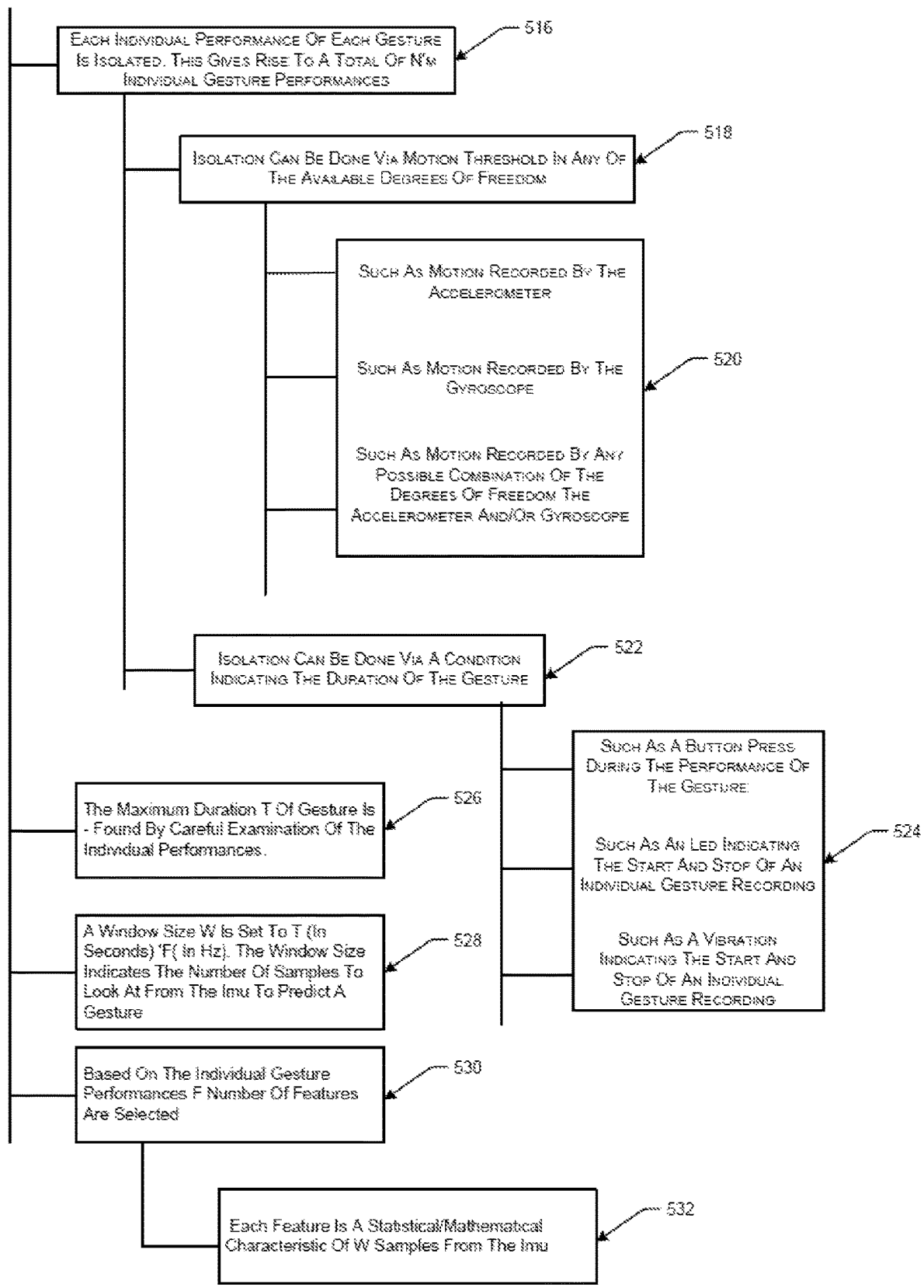
Figure 5C:
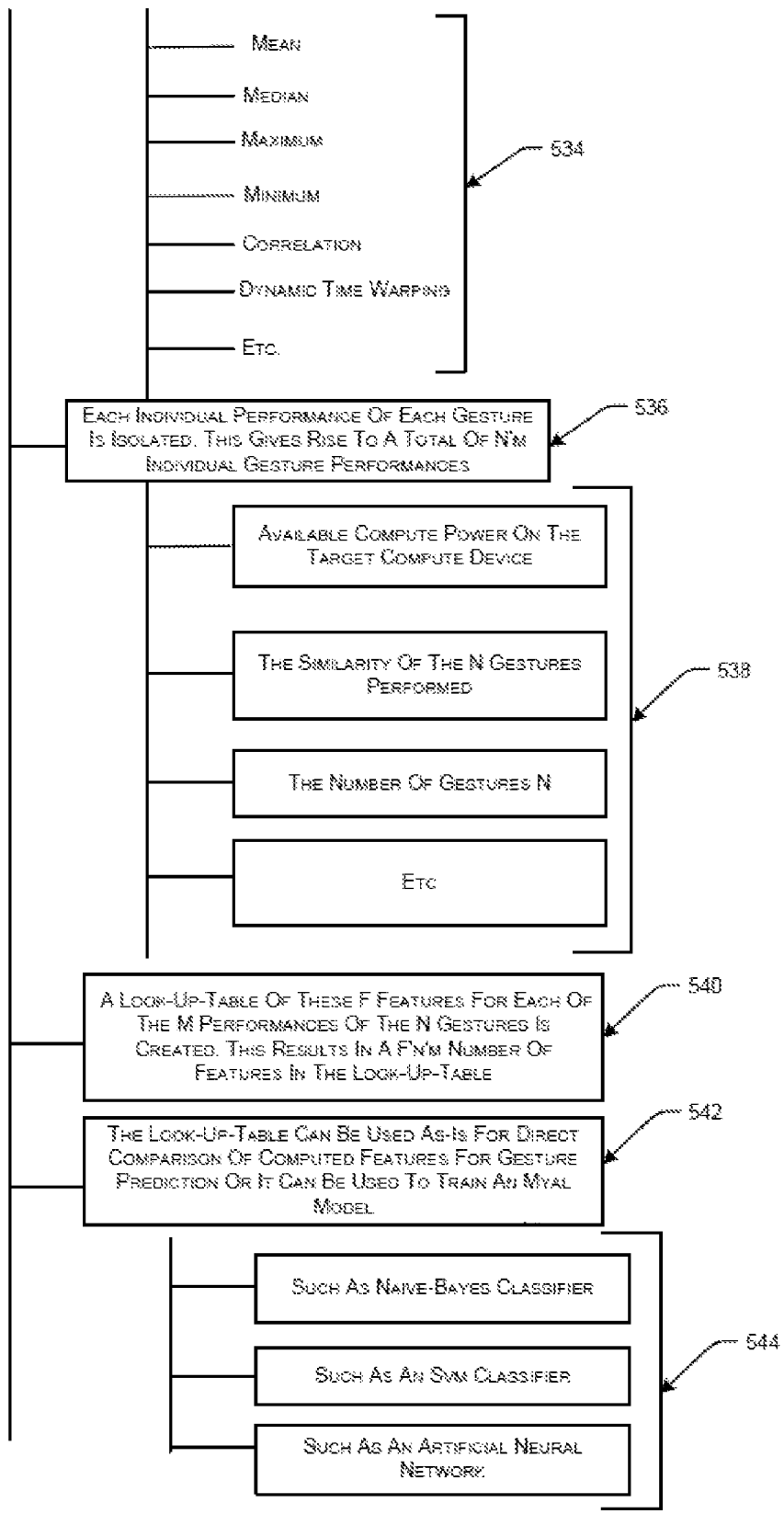
Figure 5D:
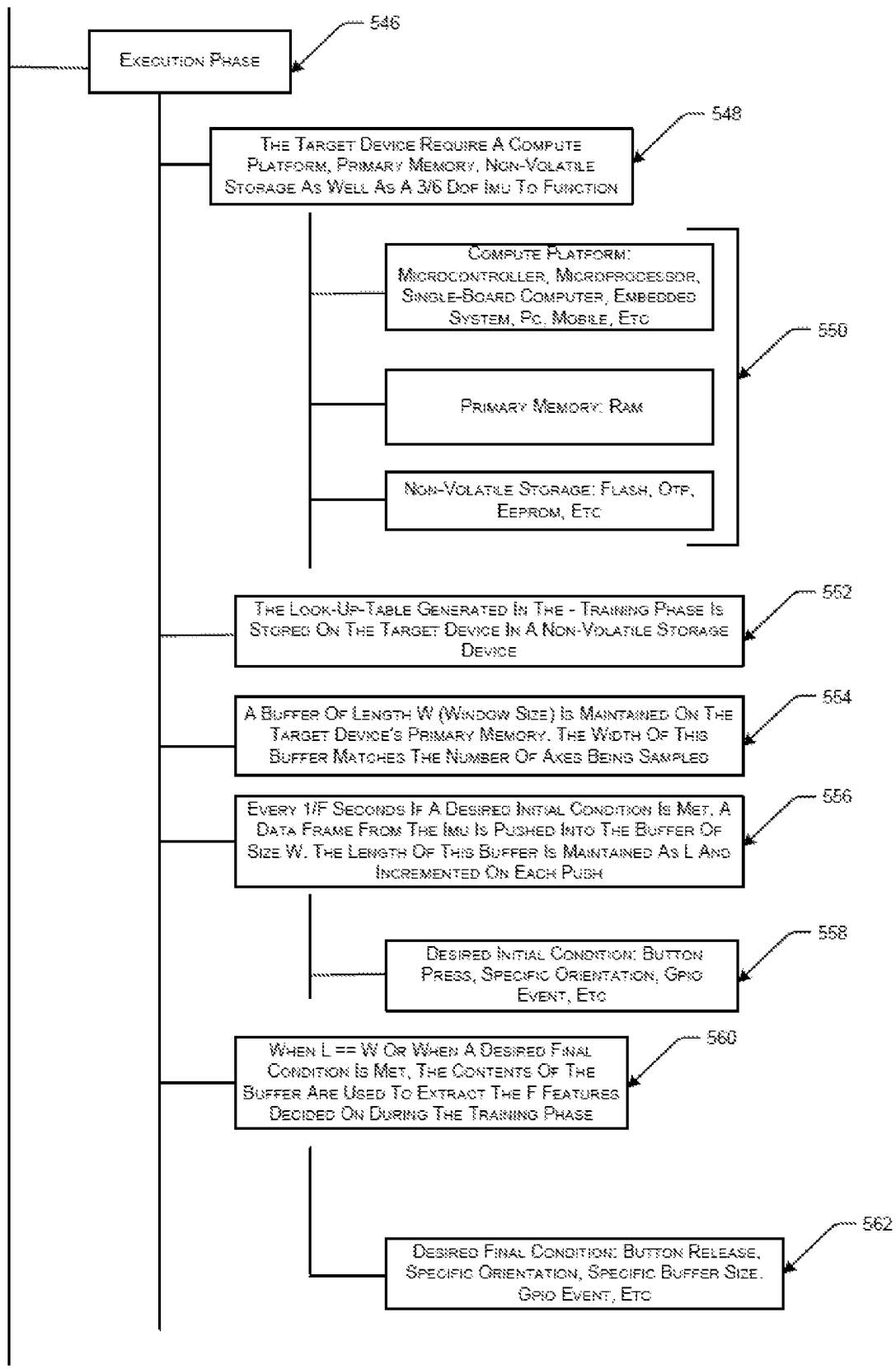
Figure 5E:
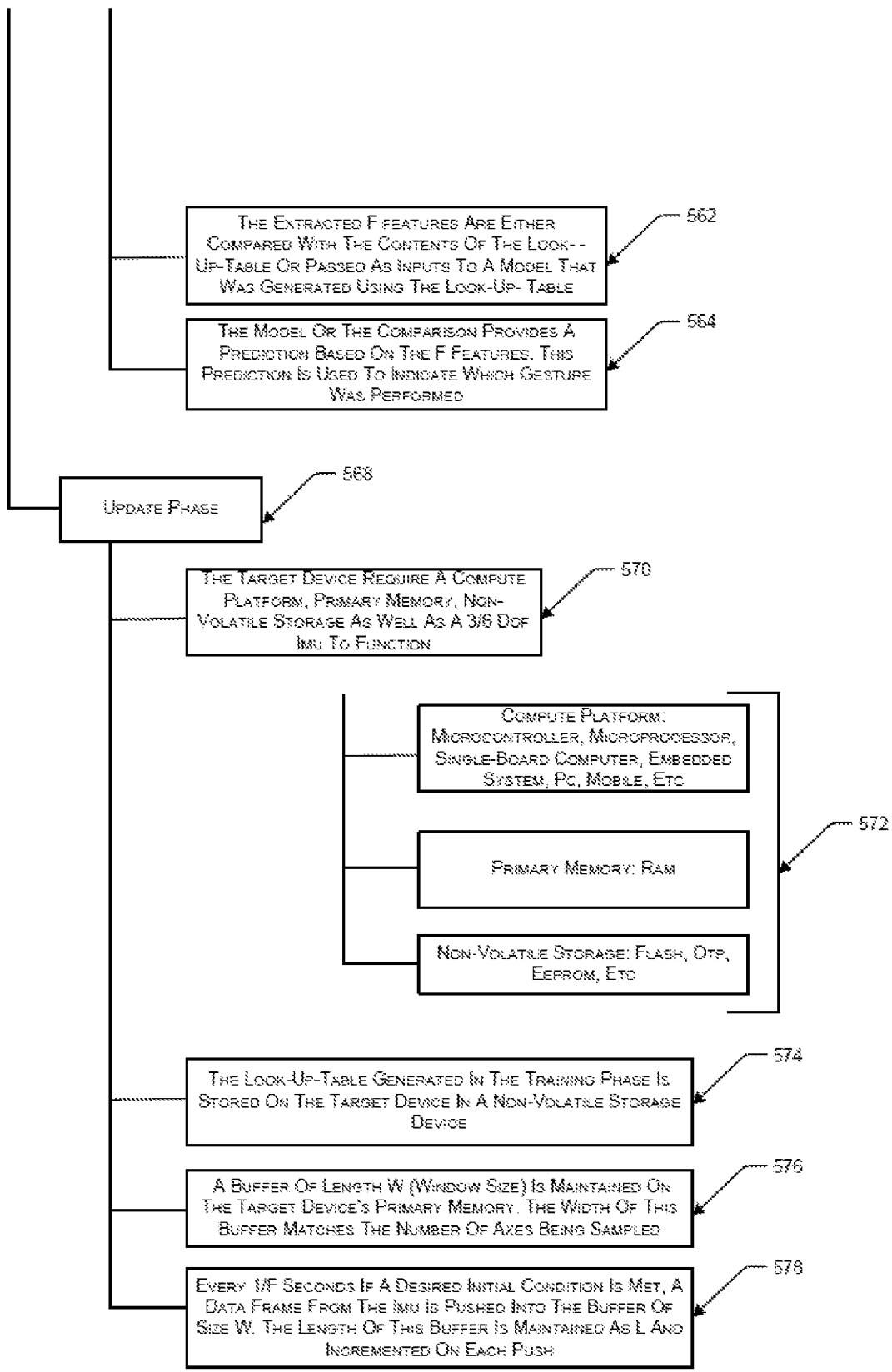
Figure 5F:
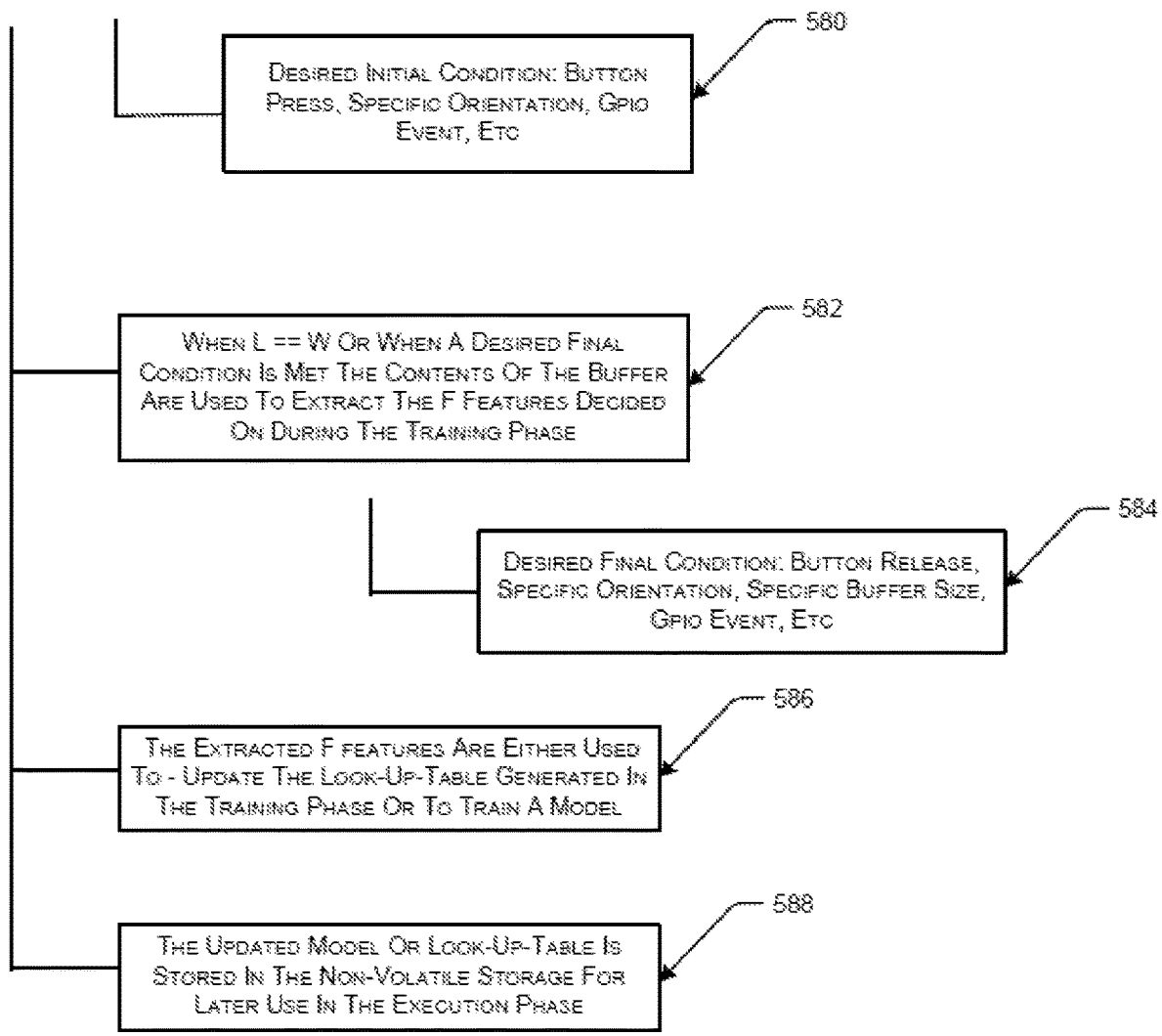

FIG. 4 illustrates a method of working of proposed system in accordance with an exemplary embodiment of the present disclosure.

In an embodiment, the process of gesture prediction can be performed by first extracting, by a plurality of sensors (110) coupled to the one or more processors (202), at least a first set of gestures at step 402; isolating, by the one or more processors (202), the first set of gestures based on a first set of motion threshold values and a first set of preset configuration parameters to determine a second set of gestures, wherein a window size (320) of a particular length stores the second set of gestures at step 404.

Further, step 406 may pertain to extracting, by the one or more processors, a first set of features, based on the window size (320) and a second set of preset configuration parameters, the one or more features being used to generate one or more Look-Up-Tables (340). Furthermore, at step 408, maintaining, by the one or more processors (202), the Look-Up-Table (340) at the non-volatile storage device (112) may be provided; while step 410 may pertain to generating, by the one or more processors (202), a buffer window (320) based on a third set of preset configuration parameters and the Look-Up-Table (340).

Furthermore, step 412 may pertain to comparing, by the one or more processors (202), the first set features with the contents of the Look-Up-Table (340) and a predetermined set of features to determine a second set of features. Also, step 414 may include predicting, by the one or more processors (202), performance of a gesture based on the Look-Up-Table (340) and the second set of features.

Furthermore, step 416 may pertain to training, by the one or more processors (202), the performance of a gesture to be generated on receipt of a third set of sensors from the plurality of sensors (110); and; while updating, by one or more processors (208), the second set of features into the Look-Up-Table (340) can be carried out at step 418. Thus, the gesture prediction can be performed by a simple procedure that can be performed even in computationally weaker systems.

FIG. 5A-F illustrates a high-level flow diagram representing exemplary working of the proposed system in accordance with an embodiment of the present disclosure.

In an embodiment, with respect to FIG. 5A-F, at block 502, training phase is generated which can include various functionalities wherein at block 504, a data logging system can be set, wherein at block 506 can include a 3 or 6 Degrees of Freedom Inertial Motion Unit (IMU), wherein at block 508, a computing platform can include a phone, a Personal Computer, a Single Board Computer, an Embedded System. The logging system at block 504 can provide at block 510 a bridging interface between the IMU and the computing platform. The data logging system at block 504 can provide at block 512, a system setup such that data from the IMU is sent to the Computing platform at a fixed frequency F. At block 502, training phase is started at block 514, wherein using the data logging system N gestures are performed M number of times where M>=3. At block 516, each individual performance of each gesture is isolated. This gives rise to a total of N*M individual gesture performances, wherein, at block 518, isolation can be done via motion threshold in any of the available degrees of freedom, wherein at block 520, the motion threshold conditions being motion recorded by the accelerometer, motion recorded by the gyroscope, motion recorded by any possible combination of the degrees of freedom of the accelerometer and/or gyroscope. At block 522, isolation can be done via a condition indicating the duration of the gesture, wherein at block 524, the conditions pertain to a button press during the performance of the gestures, an LED indicating the start and stop of an individual gesture recording, a vibration indicating the start and stop of an individual gesture recording.

As illustrated in FIG. 5A-F, at block 502, training phase continues to perform processing such that at block 526, the maximum duration T of gesture is found by careful examination of the individual performances. At block 528, a window size 320 W is set to T (in seconds)*F (in Hz). The window size 320 indicates the number of samples to look at from the IMU to predict a gesture. At block 530, based on the individual gesture performances F number of features are selected. At block 532, each feature is a statistical/mathematical characteristic of W samples from the IMU, wherein, the features being at block 534, Mean, Median, Maximum, Minimum, Correlation, Dynamic Time Warping etc. At block 502, training phase continues to perform processing such that at block 536, the number of features F can be selected on the basis of various operating parameters, wherein, at block 538, the parameters being available compute power on the target compute device 304, the similarity of the N gestures performed, the number of gestures N, etc. At block 502, training phase continues to further perform processing such that at block 540, a Look-Up-Table 340 of these F features for each of the M performances of the gestures is created. This results in a F*N*M number of features in the Look-Up-Table 340. At block 542, the Look-Up-Table 340 can be used as-is for direct comparison of computed features for gesture prediction or it can be used to train an ML/AI model, wherein the ML/AI models being at block 544, Naive-Bayes Classifier, SVM Classifier, Artificial Neural Network.

As illustrated in FIG. 5A-F, at block 546, Execution Phase is carried out. At block 548, the target device 304 require a compute platform, primary memory, non-volatile storage as well as a 3/6 DoF IMU to function, wherein at block 550, Compute platform can include Microcontroller, Microprocessor, Single-board Computer, Embedded System, PC, Mobile, etc. Primary memory: RAMN on-volatile Storage: Flash, OTP, EEPROM, etc. At block 546, execution phase continues to perform processing such that at block 552, the Look-Up-Table 340 generated in the training phase is stored on the target device 304 in a non-volatile storage device 304. At block 554, a buffer of length W (window size 320) is maintained on the target device 304's primary memory. The width of this buffer matches the number of axes being sampled. At block 556, every 1/F seconds if a desired initial condition is met, a data frame from the IMU is pushed into the buffer of size W. The length of this buffer is maintained as L and incremented on each push, wherein at block 558, desired Initial Condition: Button press, specific orientation, GPIO event, etc. At block 546, execution phase continues to perform processing such that at block 560, when L==W or when a desired final condition is met, the contents of the buffer are used to extract the F features decided on during the training phase, wherein at block 562, desired Final Condition: Button release, specific orientation, specific buffer size, GPIO event, etc. At block 546, execution phase continues to perform processing such that at block 564, the extracted F features are either compared with the contents of the Look-Up-Table 340 or passed as inputs to a model that was generated using the Look-Up-Table 340. At block 566, the model or the comparison provides a prediction based on the F features. This prediction is used to indicate which gesture was performed.

As illustrated in FIG. 5A-F, at block 568, Update Phase is carried out. At block 570, the device 304 require a compute platform, primary memory, non-volatile storage as well as a 3/6 DoF IMU to function, wherein at block 572, compute platform can include Microcontroller, Microprocessor, Single-board Computer, Embedded System, PC, Mobile, etc. Primary memory: RAM Non-volatile Storage: Flash, OTP, EEPROM, etc. At block 568, update phase continues to perform processing such that at block 574, the Look-Up-Table 340 generated in the training phase is stored on the target device 304 in a non-volatile storage device 304. At block 576, a buffer of length W (window size 320) is maintained on the target device 304's primary memory. The width of this buffer matches the number of axes being sampled. At block 578, every 1/F seconds if a desired initial condition is met, a data frame from the IMU is pushed into the buffer of size W. The length of this buffer is maintained as L and incremented on each push, wherein at block 580, desired Initial Condition: Button press, specific orientation, GPIO event, etc. At block 568, update phase continues to perform processing such that at block 582, when L==W or when a desired final condition is met, the contents of the buffer are used to extract the F features decided on during the training phase, wherein at block 584, desired Final Condition: Button release, specific orientation, specific buffer size, GPIO event, etc. At block 568, update phase continues to perform processing such that at block 586, the extracted F features are either compared with the contents of the Look-Up-Table 340 or passed as inputs to a model that was generated using the Look-Up-Table 340. At block 588, the updated model or Look-Up-Table 340 is stored in the non-volatile storage for later use in the execution phase.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Accordingly, one or more embodiments of the disclosure provides at least the following advantages. The present disclosure provides a system and method for providing gesture prediction in real time.

The present disclosure provides a system and method for providing a computationally efficient system and method that can be run on a computationally weaker embedded system such as an 8 bit MCU with minimum latency and high accuracy.

The present disclosure provides a system and method for providing on-device training of gestures which can be added without the target device being tethered to a high-power compute platform.

The present disclosure provides a system and method that can perform even with lower training samples as low as three and provide a great degree of accuracy.

The present disclosure provides for a system and method for low latency which can be in the range less than 100 ms on a simple 8 bit MCU.

The present disclosure provides for a system and method that performs gesture prediction in real-time.

I claim:

1. A system for gesture prediction, comprising:
a non-transitory storage device having embodied therein one or more routines operable to store and update gestures; and
one or more processors coupled to the non-transitory storage device and operable to execute the one or more routines to:
extract, by a plurality of sensors coupled to the one or more processors, at least a first set of gestures;
isolate, by the one or more processors, the first set of gestures based on a first set of motion threshold values and a first set of preset configuration parameters, to determine a second set of gestures, wherein a window size of a particular length stores the second set of gestures;
extract, by the one or more processors, a first set of features, based on the window size and a second set of preset configuration parameters, one or more features of the first set of features being used to generate one or more Look-Up-Tables;
maintain, by the one or more processors, the one or more Look-Up-Tables on the non-volatile storage device;
generate, by the one or more processors, a buffer window based on a third set of preset configuration parameters and the one or more Look-Up-Tables;
compare, by the one or more processors, the first set of features with contents of the one or more Look-Up-Tables and a predetermined set of features to determine a second set of features;
predict, by the one or more processors, performance of a gesture based on the one or more Look-Up-Tables and the second set of features;
train, by the one or more processors, the performance of the gesture to be generated when received by a third set of sensors from the plurality of sensors; and
update, by the one or more processors, the second set of features into the one or more Look-Up-Tables.

2. The system as claimed in claim 1, wherein the plurality of sensors extract and process gestures in real time and transfer the gestures with a fixed frequency to perform gesture processing.

3. The system as claimed in claim 2, wherein the plurality of sensors are selected from the group consisting of: an accelerometer, a gyroscope, a magnetometer, one or more temperature and humidity sensors, and combinations thereof.

4. The system as claimed in claim 1, wherein a number of features is based on an operating parameter selected from a group consisting of: available power, similarity, number of gestures, and combinations thereof.

5. A device for gesture prediction, comprising:
a non-transitory storage device having embodied therein one or more routines operable to store and update gestures; and
one or more processors coupled to the non-transitory storage device and operable to execute the one or more routines, wherein the one or more routines comprise:
extracting, by a plurality of sensors coupled to the one or more processors, at least a first set of gestures;
isolating, by the one or more processors, the first set of gestures based on a first set of motion threshold values and a first set of preset configuration parameters, to determine a second set of gestures, wherein a window size of a particular length stores the second set of gestures;
extracting, by the one or more processors, a first set of features, based on the window size and a second set of preset configuration parameters, one or more features of the first set of features being used to generate one or more Look-Up-Tables;
maintaining, by the one or more processors, the one or more Look-Up-Tables on the non-volatile storage device;
generating, by the one or more processors, a buffer window based on a third set of preset configuration parameters and the one or more Look-Up-Tables;
comparing, by the one or more processors, the first set of features with contents of the one or more Look-Up-Tables and a predetermined set of features to determine a second set of features;
predicting, by the one or more processors, performance of a gesture based on the one or more Look-Up-Tables and the second set of features;
training, by the one or more processors, the performance of the gesture to be generated when received by a third set of sensors from the plurality of sensors; and
updating, by the one or more processors, the second set of features into the one or more Look-Up-Tables.

6. The device as claimed in claim 5, wherein isolation of gestures is provided for a particular time period indicating a start and a stop of an individual gesture recording, wherein the time period is ascertained by one or more factors selected from the group consisting of: pressing of a button, blinking of an LED, vibration of the device, and combinations thereof.

7. The device as claimed in claim 5, wherein the device is selected from the group consisting of: one or more handheld devices, one or more mounted devices, one or more wearable devices, and combinations thereof.

8. A method for providing gesture prediction, the method comprising:
extracting, by a plurality of sensors coupled to one or more processors, at least a first set of gestures;
isolating, by the one or more processors, the first set of gestures based on a first set of motion threshold values and a first set of preset configuration parameters, to determine a second set of gestures, wherein a window size of a particular length stores the second set of gestures;
extracting, by the one or more processors, a first set of features, based on the window size and a second set of preset configuration parameters, one or more features of the first set of features being used to generate one or more Look-Up-Tables;
maintaining, by the one or more processors, the one or more Look-Up-Tables at the non-volatile storage device;
generating, by the one or more processors, a buffer window based on a third set of preset configuration parameters and the one or more Look-Up-Tables;
comparing, by the one or more processors, the first set of features with contents of the one or more Look-Up-Tables and a predetermined set of features to determine a second set of features;
predicting, by the one or more processors, performance of a gesture based on the one or more Look-Up-Tables and the second set of features;
training, by the one or more processors, the performance of the gesture to be generated when received by a third set of sensors from the plurality of sensors; and updating, by the one or more processors, the second set of features into the one or more Look-Up-Tables.

9. The method as claimed in claim 8, wherein the first set of features are extracted based on a frequency defined in the first set of preset configuration parameters.

10. The method as claimed in claim 9, wherein the second set of features are extracted based on a fixed buffer window size and the first set of preset configuration parameters.

* * * * *